(12) United States Patent
Way et al.

(10) Patent No.: US 6,535,315 B1
(45) Date of Patent: Mar. 18, 2003

(54) OPTICAL FIBER TRANSMITTER FOR SIMULTANEOUSLY SUPPRESSING STIMULATED BRILLOUIN SCATTERING AND SELF/EXTERNAL-PHASE MODULATION-INDUCED NOLINEAR DISTORTIONS IN A LONG-DISTANCE BROADBAND DISTRIBUTION SYSTEM

(75) Inventors: Winston I. Way, Hsinchu (TW); Ming-Chia Wu, Taichung Hsien (TW); Chiung-Hung Wang, Taoyuan Hsien (TW)

(73) Assignee: New Elite Technologies, Inc., Hsinchu (TW)

( * ) Notice: Subject to any disclaimer, the term of this patent is extended or adjusted under 35 U.S.C. 154(b) by 0 days.

(21) Appl. No.: 09/490,020

(22) Filed: Jan. 21, 2000

(51) Int. Cl.[7] ............................................. H04B 10/04
(52) U.S. Cl. .................. 359/180; 359/176; 359/184; 359/185; 359/186; 359/187; 359/188
(58) Field of Search ................. 359/176, 180, 359/184, 185, 186, 187, 188

(56) References Cited

U.S. PATENT DOCUMENTS

| | | | |
|---|---|---|---|
| 5,420,868 A | 5/1995 | Chraplyvy et al. ........ 370/122 |
| 5,515,196 A | * 5/1996 | Kitajima et al. ............ 359/180 |
| 5,566,381 A | 10/1996 | Korotky ..................... 359/183 |
| 5,777,771 A | * 7/1998 | Smith ......................... 359/180 |
| 5,828,477 A | 10/1998 | Nilsson et al. ............. 359/180 |
| 6,252,693 B1 | * 6/2001 | Blauvelt ..................... 359/183 |
| 6,282,003 B1 | * 8/2001 | Logan et al. ............... 359/161 |

* cited by examiner

Primary Examiner—Leslie Pascal
Assistant Examiner—Dzung Tran
(74) Attorney, Agent, or Firm—J. C. Patents

(57) ABSTRACT

The invention provide an optical fiber transmitter by both suppressing stimulated Brillouin scattering (SBS) effect and composite second-order (CSO) distortions at an optimized condition. The optical fiber transmitter includes a frequency modulator generating a first tone microwave with frequency f1 coupled to a laser source, and a phase modulator generating a second tone microwave with frequency f2 coupled to an external phase modulator, so as to broaden the modulated light spectrum. The first tone microwave with frequency f1 is set to be greater than 2 to 3 times of the highest frequency content in the modulating signals. The second tone microwave with frequency f2 is designed to be close to a harmonic frequency of f1 and no less than three times of f1. The first tone microwave with frequency f1 and a second frequency f2 are inputted to two power amplifiers, respectively, and then are respectively inputted to a laser source and an external phase modulator. These two power amplifiers are controlled by an microprocessor to automatically adjust a desired phase modulation index at 1.4 for the optical fiber transmitter with a repeaterless design or at an desired index depending on the desired transmission distance in a repeater design. The external phase modulator is coupled to a pare of fiber amplifiers for the repeaterless design or several pairs of fiber amplifers coupled in series for the repeater design. The last pair of the fiber amplifiers are coupled to optical receivers.

20 Claims, 8 Drawing Sheets

OPTICAL FIBER TRANSMITTER FOR SIMULTANEOUSLY SUPPRESSING STIMULATED BRILLOUIN SCATTERING AND SELF/EXTERNAL-PHASE MODULATION-INDUCED NOLINEAR DISTORTIONS IN A LONG-DISTANCE BROADBAND DISTRIBUTION SYSTEM

BACKGROUND OF THE INVENTION

1. Field of Invention

The present invention relates to a lightwave transmission system. More particularly, the present invention relates to a light wave source designed to simultaneously suppress stimulated brillouin scattering (SBS) effects and composite second-order (CSO) distortions, which is induced by self phase modulation and external phase modulation, in a long-distance transmission system.

2. Description of Related Art

The recent trend of distributing broadcasting multi-channel amplitude-modulated (AM) cable TV signals over a distance greater than about 50 Km usually utilizes an optical fiber transmission system operating in the 1550 nm wavelength region. These systems usually use an optical transmitter which is composed of a high-power 1550 nm laser diode, a $LiNbO_3$-based external modulator, and a booster erbium-doped fiber amplifier (EDFA) whose output power can exceed 20 dBm. It is well-know that although the optical power from this kind of transmitter can be increased almost indefinitely by using a high-power booster EDFA, the maximum optical power which can be launched into a single-mode fiber is limited by stimulated Brillouin scattering (SBS). The SBS effect causes reflection of input optical waves by the refractive-index grating, which is formed by acoustic waves travelling at a velocity of about 6 km/sec in the fiber. When the injected light is strong, the index grating is reasonantly enhanced by the input optical wave, resulting in more reflections. There have been several inventions proposed to solve this problem. Form example, the U.S. Pat. Nos. 5,420,868, 5,566,381, and 5,828,477 have proposed some solutions, in which the U.S. Pat. No. 5,828,477 allows an optical power of 17 dBm to be launched into a broadband optical fiber distribution system. However, the transmission distance can only be up to 50 Km. In the current stage, there is no commercial optical transmitter that can be used to deliever the multi-channel AM cable TV (CATV) signals over a distance greater than 65 Km. Ideally, for a launched transmitter power of 17 dBm with a typical optical receiver sensitivity of 0 dBm and an optical fiber transmission loss of 0.2–0.22 dB/km, the maximum transmission distance should be around (17–0)/0.22~77 km or (17–0)/0.22~85 km. Unfortunately, it can transmit by only 50 km at the limit range.

A repeaterless system in an optical transmission system usually means that only one EDFA is used for long-distance transmission. Currently, a repeaterless system can only transmit a limited distance of 50–65 km due to combined effects of self-phase modulation (SPM) and external-phase modulation (EPM). The SPM effect results from the launched power dependent-refractive index, which causes the phase of the optical field to vary as a function of distance. The EPM effect results from the light beam travelling through an external phase modulator. The combined effects of SPM and EPM cause usually composite second-order (CSO) distortions in a long-distance 1550 nm AM-CATV system. The SPM and EPM effects cause PM (phase modulation)-to-AM (amplitude modulation) conversion due to optical fiber dispersions, where the AM components are not desired. As a result, large CSO distortions occur after a long transmission distance. This negative effect becomes more serious as the EPM modulation depth becomes higher.

In the optical transmission system, the above SBS and CSO effects are two main problems necessarily to be solve. Conventionally, the SBS effect is suppressed by broadening the optical spectrum as wide as possible. There is no consideration about the damage to the external modulator due to large microwave driving power. The conventional manner only suppresses the SBS effect but cannot suppress the CSO distortions resulting from PM-to-AM conversion for a distance longer than about 65 km.

SUMMARY OF THE INVENTION

It is at least an objective that the invention provides an optical fiber transmitter to achieve a long transmission distance greater than about 75 km by suppression both the SBS effect and the CSO effects at an optimized condition, which is adjustable depending on the desired transmission distance.

The present invention provide an optical fiber transmitter, which includes a frequency modulator generating a first tone microwave with frequency f1 coupled to a laser source, and a phase modulator generating a second tone microwave with microwave with frequency f2 coupled to an external phase modulator, so as to broaden the modulated light spectrum. The first tone microwave with frequency f1 is set to be about greater than 2 to 3 times of the highest frequency content in the modulating signals. The second tone microwave with frequency f2 is designed to be about close to a harmonic frequency of f1 and no less than three times of f1. The first tone microwave with frequency f1 and a second frequency f2 are inputted to two power amplifiers, respectively, and then are respectively inputted to a laser source and an external phase modulator. These two power amplifiers are controlled by an microprocessor to automatically adjust a desired phase modulation index at 1.4 for the optical fiber transmitter with a repeaterless design or at an desired index depending on the desired transmission distance in a repeater design. The external phase modulator is coupled to a pare of fiber amplifiers for the repeaterless design or several pairs of fiber amplifiers coupled in series for the repeater design. The last pair of the fiber amplifiers are coupled to optical receivers.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The optical fiber transmitter of the invention includes a capability to simultaneously suppress the SBS effect and the CSO effect at an optimized condition, so that the transmission distance is effectively increased. Inventor has publish the solution in June 1999, M. C. Wu et al., Photonics Technologies Letters, Vol. 11, No.6, June 1999, p. 718–720. Wide spectral broadening by using PM and/or FM of the transmitted 1550 nm light can efficiently suppress SBS effect, but at a substantial cost of increased CSO when the transmission distance is long. Therefore, there must be a compromise between the SBS and CSO suppression levels. The invention constrains the spectrum broadening by properly adjusting the EPM modulation depth. The EPM modulation depth must be lower as the optical transmission distance becomes longer. How much the modulation power should be decreased depends on the actual transmission distance. For an extreme case, as the transmission distance must be maximized, the minimization of CSO distortions becomes the top priority, and the SBS suppression is no longer needed.

As discussed above, the PM and/or FM modulation depths must be appropriately adjusted particularly for a repeaterless system. For a transmission system with many in-line EDFAs and no dispersion compensation devices, the PM and/or FM modulation depths may have to be decreased to zero.

In order to increase the transmission distance, the analog AM CATV signals might be replaced by digital M-ary quadrant-amplitude-modulated (QAM) signals, such as a broadband hybrid fiber coax (HFC) system. In that case, the transmission distance can be several hundred kilo-meters, which associates with many EDFAs installed in the system. The optical fiber transmitter of the invention is at least suitable for the analog AM CATV signals or the digital M-ary QAM signals. In order to minimize the SPM-induced CSO nonlinear distortions, the modulation power in the optical fiber transmitter must be decreased.

Embodiment 1

Figure 1A:
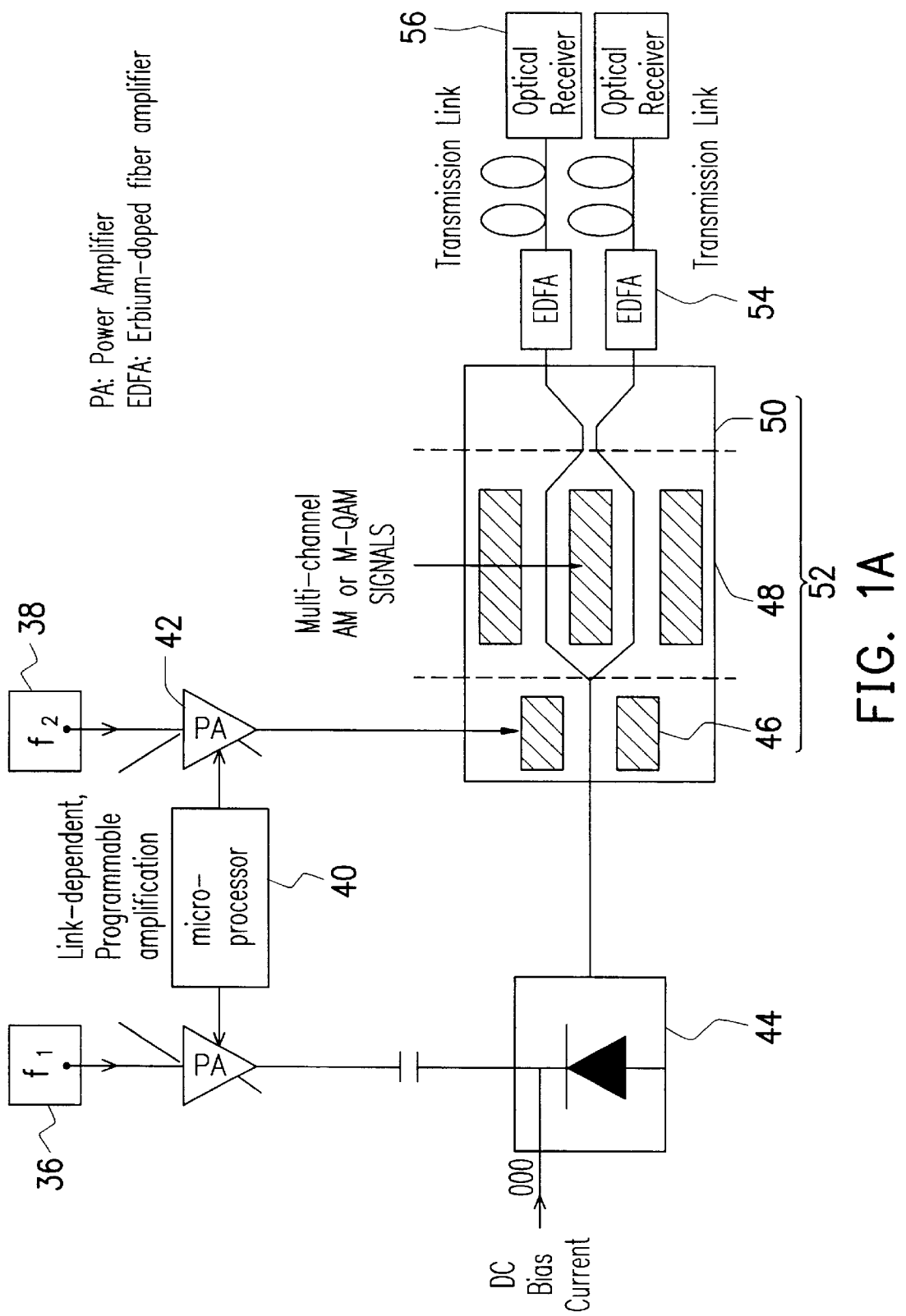
FIGS. 1A and 1B are a block diagram, schematically illustrating an architecture of an optical fiber transmitter in a repeaterless design and a repeater design, respectively, according to a preferred embodiment of the invention.
Figure 1B:
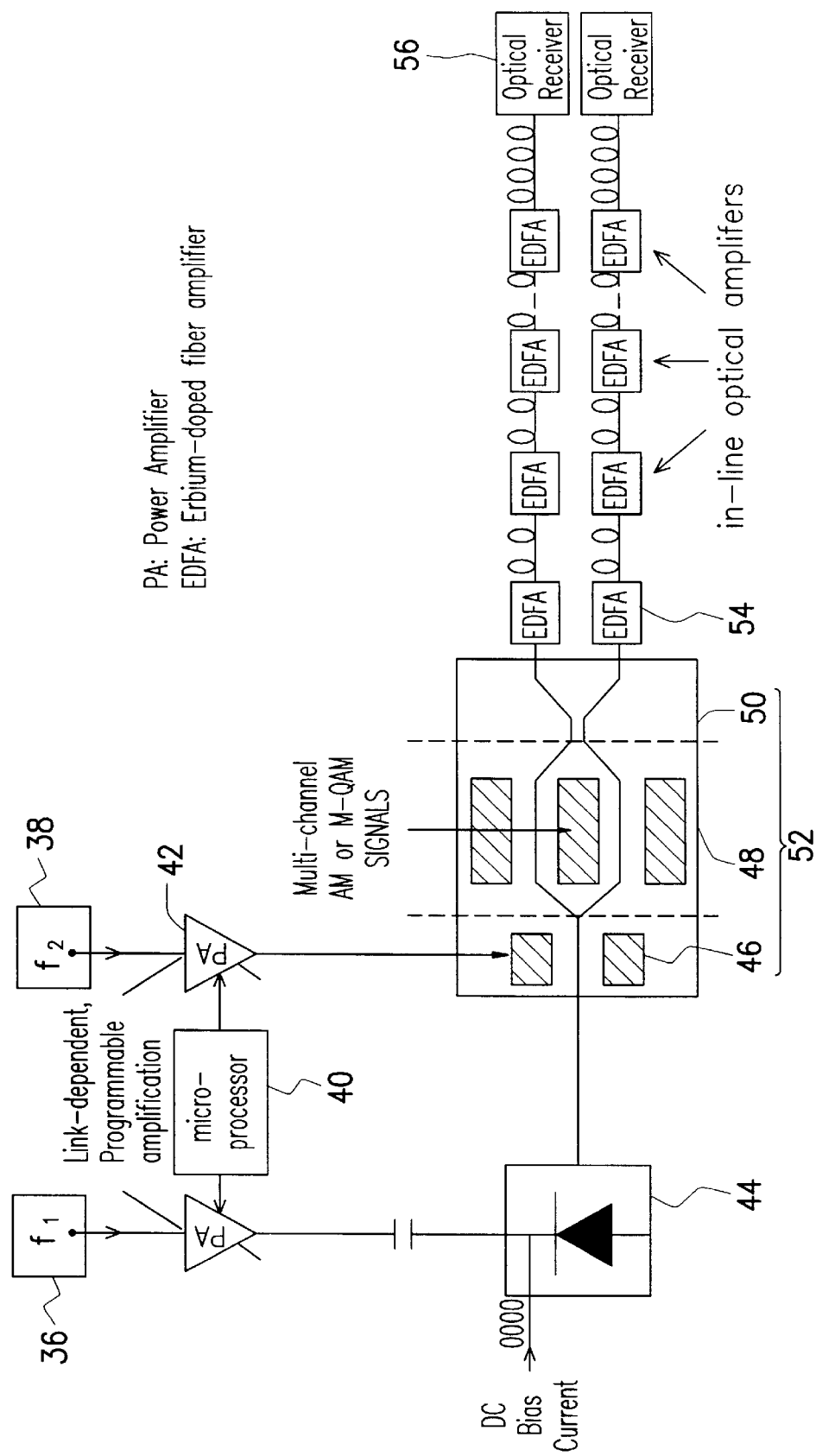

FIGS. 1A and 1B are a block diagram, schematically illustrating an architecture of an optical fiber transmitter in a repeaterless design and a repeater design, respectively, according to a preferred embodiment of the invention. According to the solution method of the invention, there are two steps in designing the corresponding optical fiber transmitter. The first step is to generate multi-frequency lightwave source to suppress SBS. In FIG. 1A, the optical fiber transmitter basically includes a light source 44, such as a laser diode or a high-power DFB laser, an external phase modulator 52, a pair of EDFA, which are sequentially coupled together. The outputs of the EDFA are transmitted to optical receiver 56. In order to achieve the desired modulation index, the invention further includes a first microwave tone means 36, such as a frequency modulator, to generate a first tone microwave with frequency f1, and a second microwave tone means 38, such as a frequency modulator, to generate a second tone microwave with frequency f2. The first tone microwave with frequency f1 and the second tone microwave with frequency f2 are coupled to two power amplifiers 42, respectively. These two tone microwaves include, for example, a single frequency microwave, a dithering microwave, or a modulated/coded microwave. The power amplifiers 42 are coupled to the laser diode 44 and the external phase modulator 52 at its phase modulator 46, respectively, so that the first tone microwave with frequency f1 drives the laser diode 44 and the second tone microwave with frequency f2 drive the phase modulator 46.

The external phase modulator 52 further includes, for example, an AM modulator receiving the output of the phase modulator 46 and a directional coupler 50 to receive the outputs from the AM modulator 48 and exports outputs to the EDFA 54. The external phase modulator 52 can be $LiNbO_3$-based or semiconductor-based. The phase modulator 46 is coupled to the AM modulator 48, such as a Mach-Zehnder intensity modulator driven by broadband analog AM or digital M-QAM signals. The Mach-Zehnder modulator 48 may have one or two output ports, or even more. Each of the output ports may be coupled to the directional coupler 50 and further coupled to a booster erbium-doped fiber amplifier (EDFA) 54. Usually the EDFA 54 coupled in pair if the directional coupler has two outputs.

Figure 2A:
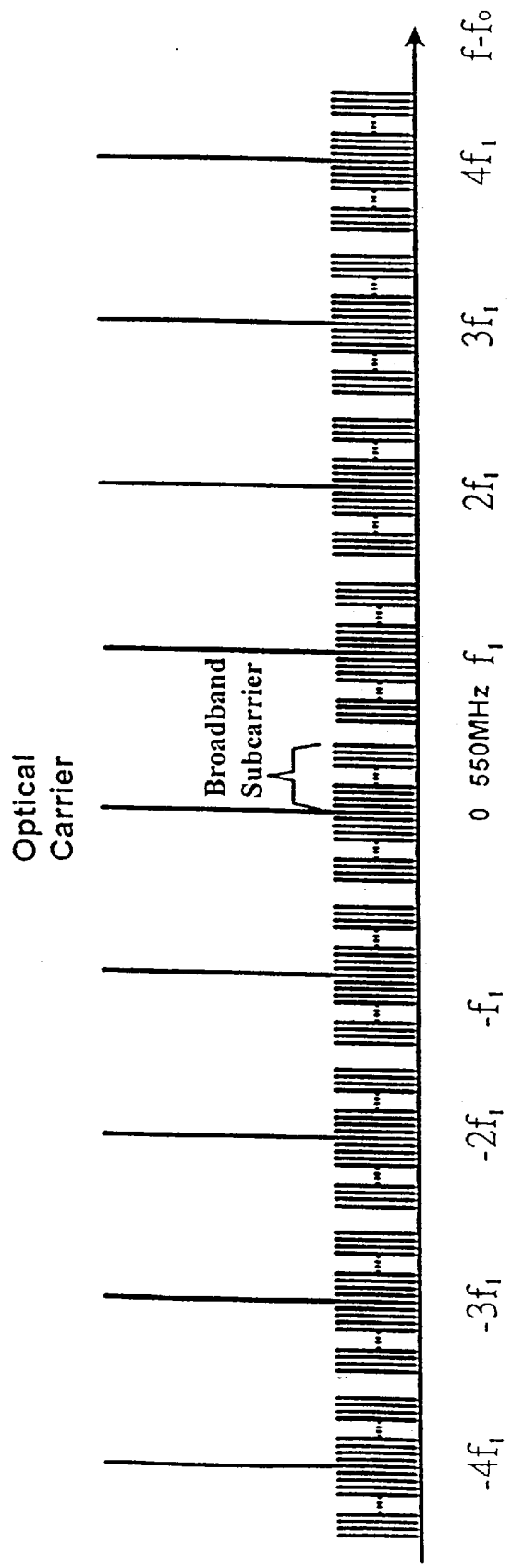
FIG. 2A is a drawing, schematically illustrating a theoretical optical spectrum produced by either FM-PM or by two tone PM techniques when f2~3f1 and the modulation indices for both tones are about 1.4, according to the preferred embodiment of the invention.
Figure 2B:
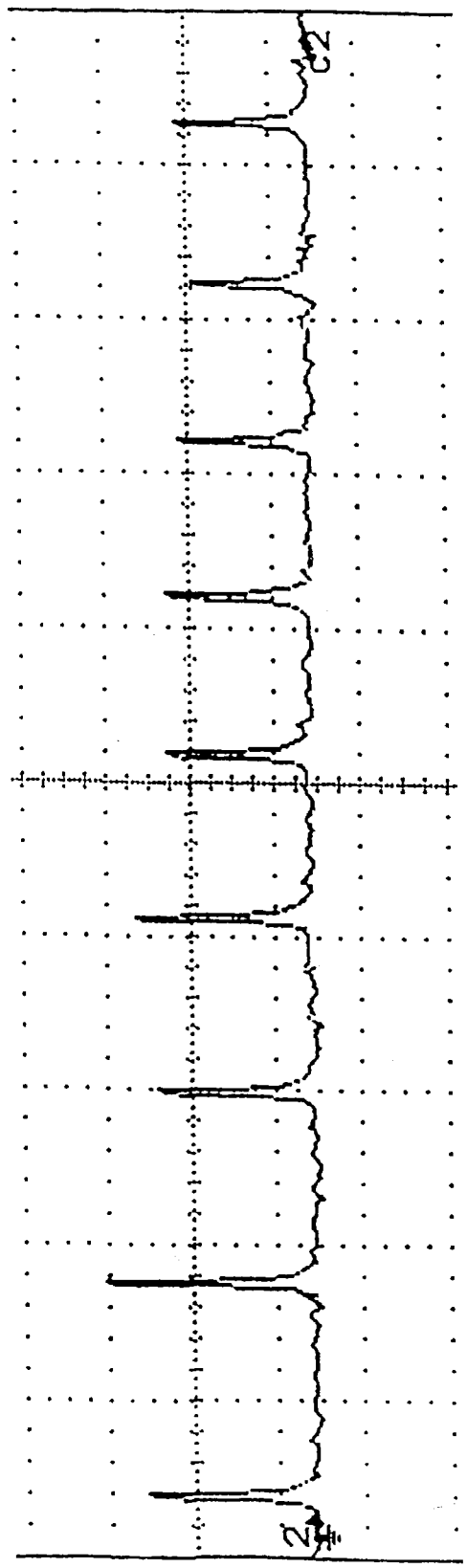
FIG. 2B is a drawing, schematically illustrating a measured optical spectrum with respect to the theoretical spectrum of FIG. 2A.

The power amplifiers 42 are controlled by a microprocess 40 so that the amplification of the power amplifier 42 are programmable for adjusting. The desired modulation indices are therefore automatically adjusted between the two tone frequencies f1 and f2 by, for example, simply giving a desire modulation index. This eases the users to use the optical fiber transmitter without difficulty to obtain the desired modulation index. The first tone microwave with frequency f1 is set to be about 2–3 times of the highest frequency content in the system. For example, a FM modulator with f1=1.72 GHz to modulate the high-power DFB laser light, where 1.72 GHz is about twice of the bandwidth of the HFC system. The second tone microwave with frequency f2 is about three times of f1, which is about 5.16 GHz. The second tone microwave with frequency f2 externally modulates the laser light preferably by PM manner. The FM first tone microwave with frequency f1 generates two sidebands 1.72 GHz away from the main optical carrier and we obtain a three-frequency light source. The PM second tone microwave with frequency f2 generates two sidebands 5.16 GHz away from each of the three frequency carriers previously generated. Therefore, the light source includes an optical spectrum having 9 frequencies. As the multi-channel CATV signals subsequently modulate the 9-frequency lightwave source, theoretical results of the optical spectrum is shown in FIG. 2A. FIG. 2A is a drawing, schematically illustrating a theoretical optical spectrum produced by either FM-PM or by two tone PM techniques when f2~3f1 and the modulation indices for both tones are about 1.4, according to the preferred embodiment of the invention. The actual measurement is shown in FIG. 2B, which is a drawing, schematically illustrating a measured optical spectrum with respect to the theoretical spectrum of FIG. 2A. It is clear that sufficient SBS suppression can be achieved by the manner of the invention. An experiment has verified that the optical power up to 18 dBm at 1550 nm can be launched into a 74 km long span of standard telecommunications single-mode optical fiber, at an FM modulation index of 1.35 and a PM modulation index of 2.4.

Figure 3:
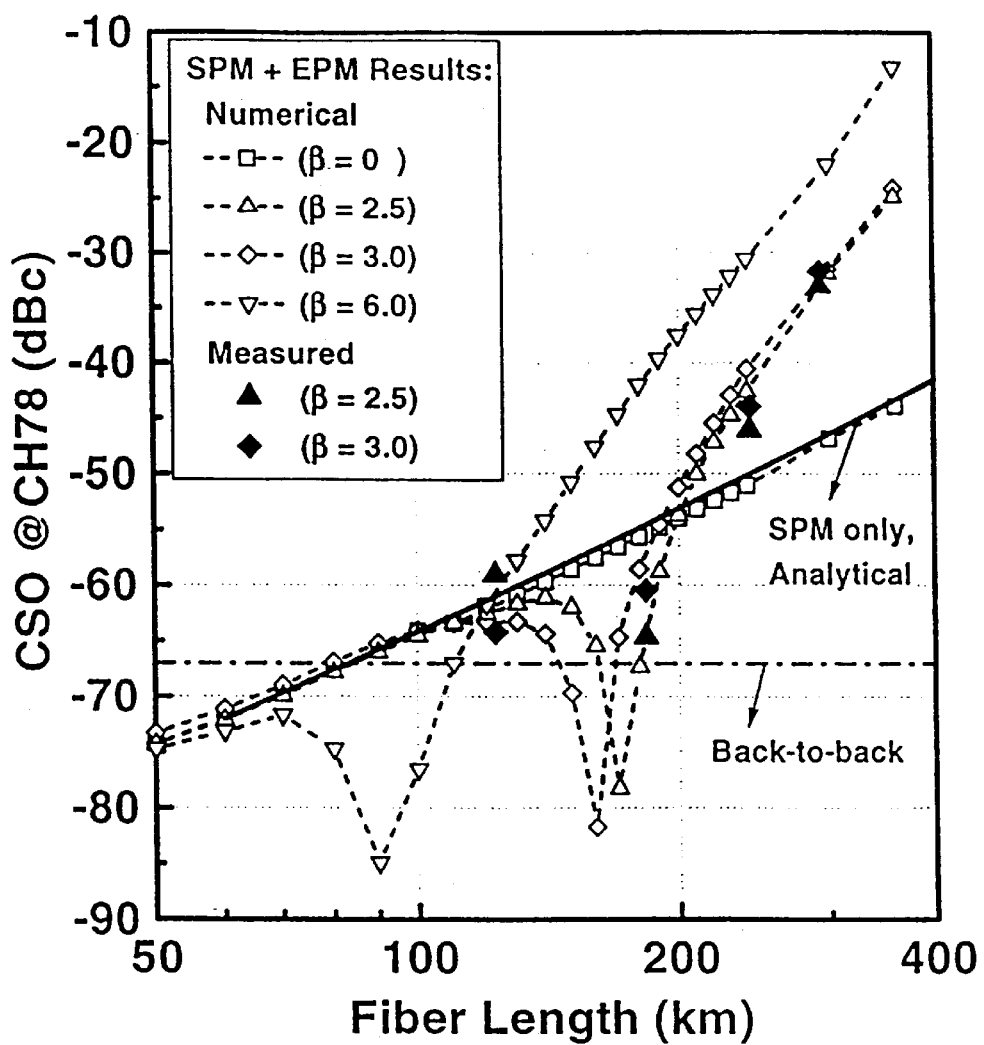
FIG. 3 is a drawing, schematically illustrating CSO quantities for measurement, numerical calculation and analytical expectation at a channel 78 as a function of the total fiber length in an equal-span, multistage-repeatered AM-CATV system, where the interstage fiber span is 60 km, the launched optical power from each EDFA is 12 dBm, single tone phase modulation is at 1.9 GHz, and the modulation depth for each of the 78 AM channels is 3%.
Figure 4:
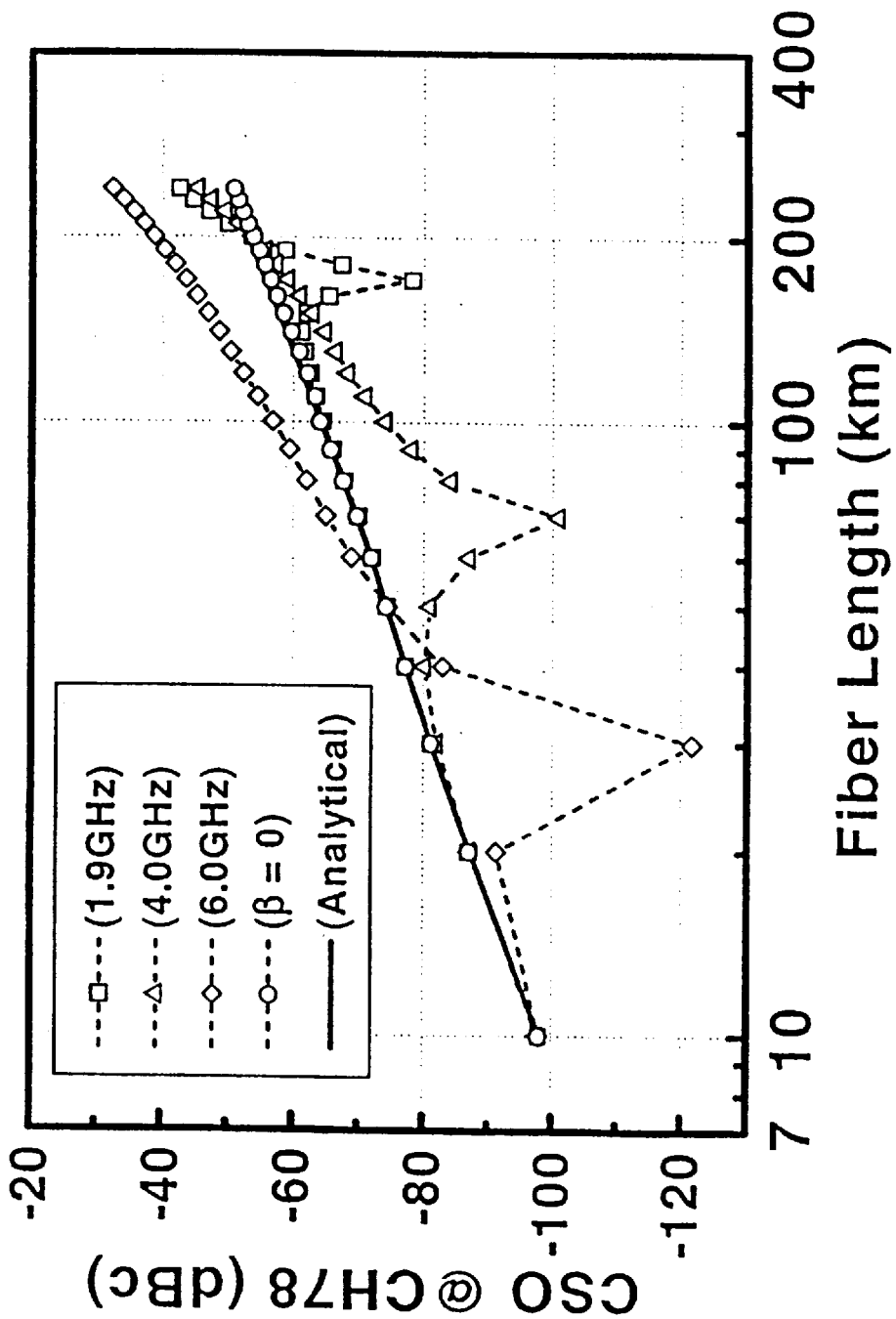
FIG. 4 is a drawing, schematically illustrating CSO quantities for measurement, numerical calculation and analytical expectation at the channel 78 as a function of the total fiber length in an equal-span, multistage repeatered AM-CATV system, where the phase modulation index is at 2.5 for all PM modulating tone frequencies, and other parameters are the same as those in FIG. 3.

The second step in designing an optical transmitter is to decrease the FM and PM modulation indices used in the first step. The reducing degrees of modulation index depend on various transmission distances. FIG. 3 is a drawing, schematically illustrating CSO quantities for measurement, numerical calculation and analytical expectation at a channel 78 as a function of the total fiber length in an equal-span, multistage-repeatered AM-CATV system, where the interstage fiber span is 60 km, the launched optical power from each EDFA is 12 dBm, single tone phase modulation is at 1.9 GHz, and the modulation depth for each of the 78 AM channels is 3%. Parameter B represents the modulation index. In FIG. 3, the solid line is the CSO distortion due to SPM effect only. The measure results show that the resultant CSO distortions are due to both SPM and EPM effects. For a typical CSO requirement of −65 dBc, one can see the larger the phase modulation index, the shorter the achievable transmission distance. This indicates that the spectral broadening must be controlled at the optimum condition. Similar characteristic is also shown in FIG. 4 as the PM modulating tone frequency increases. FIG. 4 is a drawing, schematically illustrating CSO quantities for measurement, numerical calculation and analytical expectation at the channel 78 as a function of the total fiber length in an equal-span, multistage repeatered AM-CATV system, where the phase modulation index is at 2.5 for all PM modulating tone frequencies, and other parameters are the same as those in FIG. 3.

Figure 5:
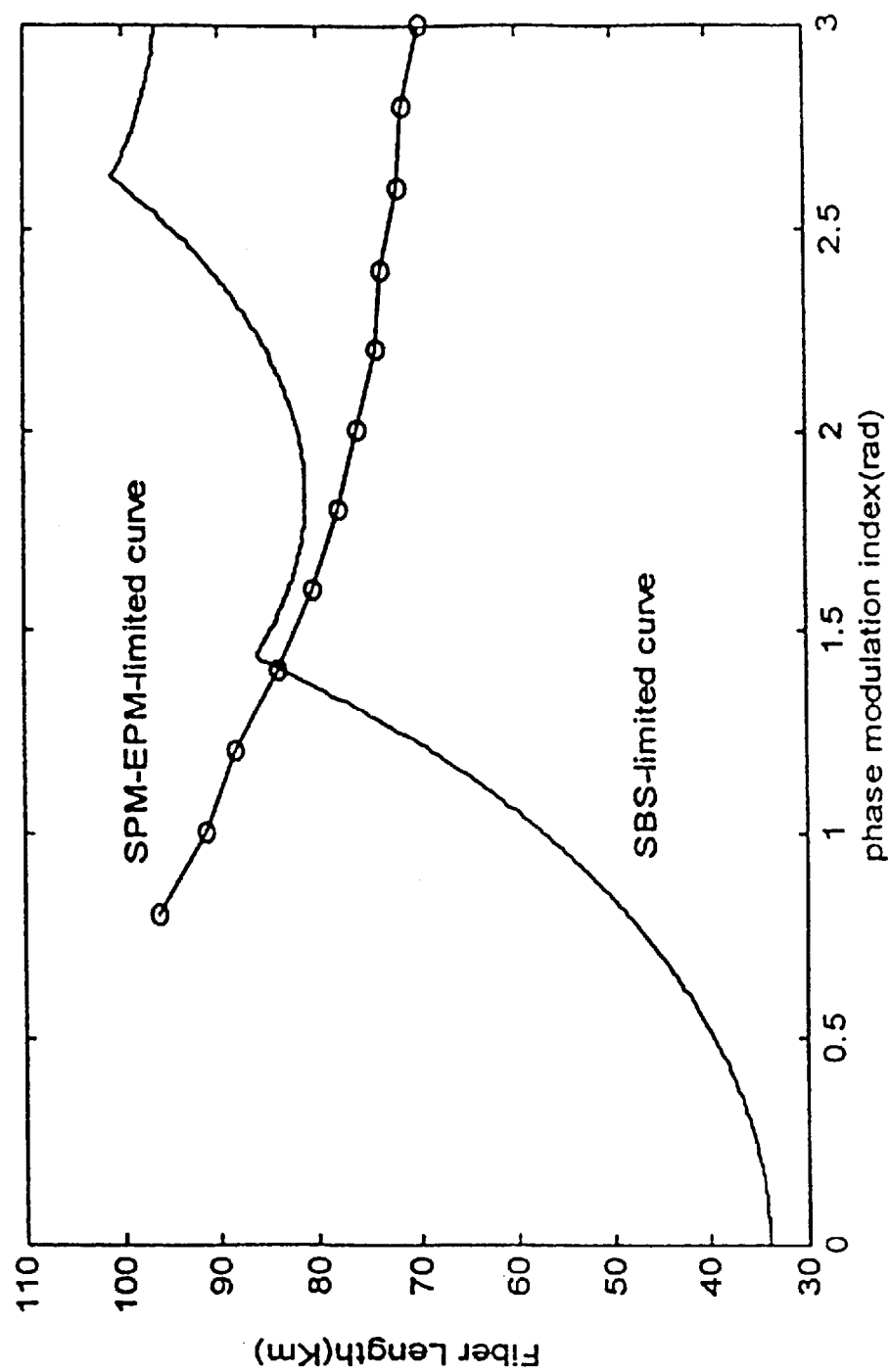
FIG. 5 is a drawing, schematically the transmission distance limited by the CSO distortions due to the combined effects of SPM and EPM (open circle), and by PM index-dependent SBS threshold for the case of two-tone PM with equal PM indices.
Figure 6:
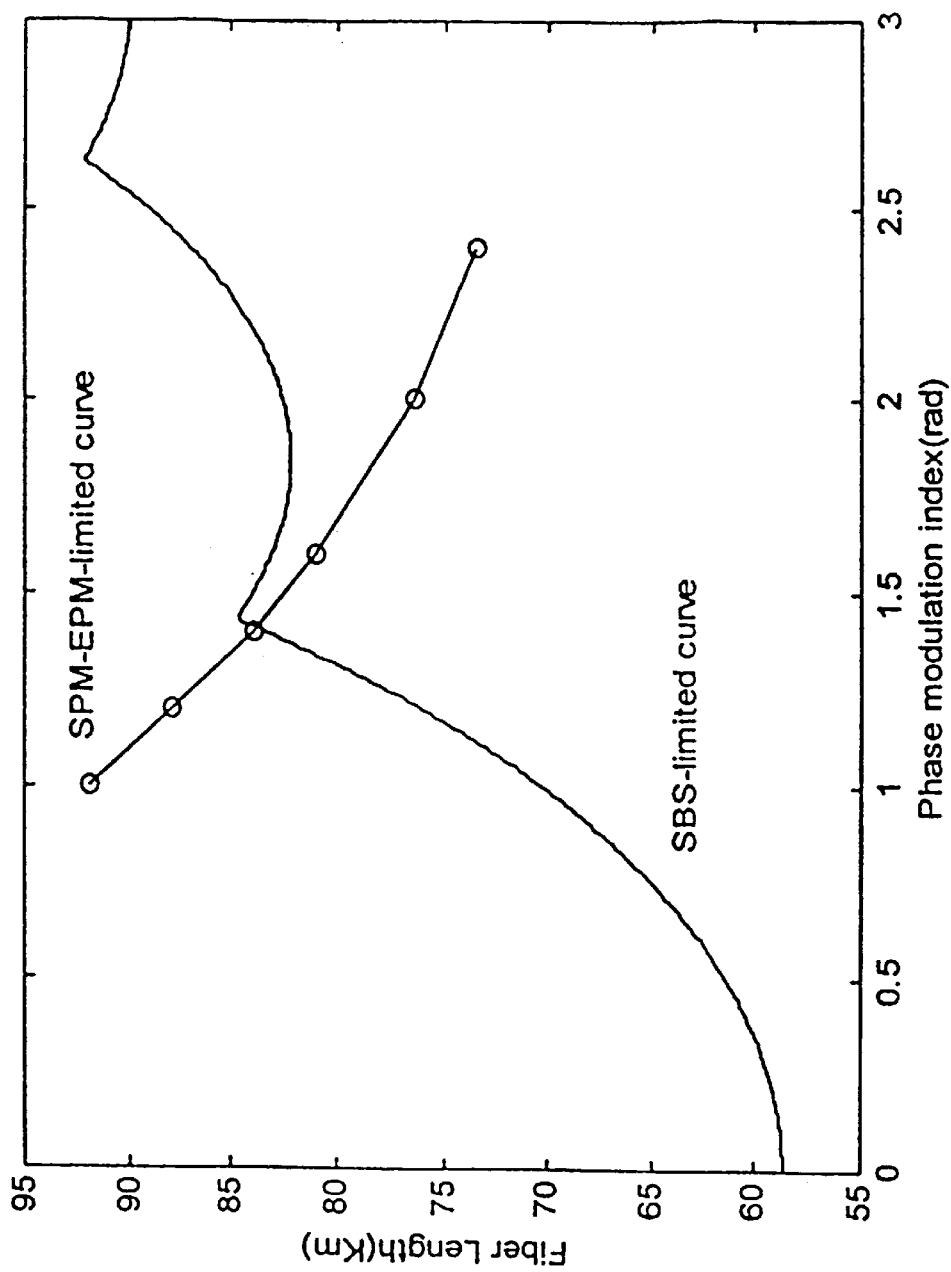
FIG. 6 is a drawing, schematically a transmission distance limited by the CSO distortions due to the combined effects of SPM and EPM (open circle), and by PM index-dependent SBS threshold for the case of FM-PM technique, in which the FM index is fixed at 1.4.

To find the optimum PM/FM modulation index for a longest repeaterless optical fiber system, several theoretical curves for the fiber length under SBS and CSO effects curves as functions of modulation index are shown in FIGS. 5 and 6. FIG. 5 is a drawing, schematically the transmission distance limited by the CSO distortions due to the combined effects of SPM and EPM (open circle), and by PM index-dependent SBS threshold for the case of two-tone PM with equal PM indices. FIG. 6 is a drawing, schematically a transmission distance limited by the CSO distortions due to the combined effects of SPM and EPM (open circle), and by PM index-dependent SBS threshold for the case of FM-PM technique, in which the FM index is fixed at 1.4.

In both cases in FIGS. 5 and 6, one can see the maximum repeaterless transmission distance can be as long as about 84 km as the modulation index per tone is around 1.4. The invention has achieved this transmission distance by allowing the modulation index to be adjusted at 1.4. This is quite different from the conventional manner, which set the PM modulation index per tone at 2.4 (see U.S. Pat. No. 5,828, 477). In the invention, the first tone microwave with frequency f1 and the second tone microwave with frequency f2 are controlled by the microprocessor 40 as shown in FIG. 1A or FIG. 1B so that the user can easily obtain the desired modulation index without extra knowledge to properly adjust the modulation index from the combination of the first tone microwave with frequency f1 and the second tone microwave with frequency f2.

Embodiment 2

Based on the structure shown in FIG. 1A and FIG. 1B, there are at least two alternative structures. For example, instead, both the first frequency modulator 36 and the second frequency modulator 38 are all coupled to the light source 44 or both the first frequency modulator 36 and the second frequency modulator 38 are all coupled to the phase modulator 46.

In conclusion, the invention provides an optical fiber transmitter to simultaneously suppress the SBS effect and the CSO effect at the optimum condition so that a transmission distance of about 84 km for the repeaterless design is achieved. The invention use two tone frequencies under control to suppress the SBS effect. The optimum modulation index is discovered to be at 1.4 for the repeaterless system so that the CSO distortion induced by SPM and EPM effects is effectively reduced, resulting in the achievement of the maximum transmission distance. The adjustment of the optimum modulation index can be automatically done by a microprocessor with the control program.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical fiber transmitter comprising:
   a light source to produce a light in use;
   a first frequency modulator coupled to the light source, wherein the first frequency modulator generates a first tone microwave with a first frequency f1 to drive the light source;
   an external phase modulator coupled to the light source to receive the light exported from the light source;
   a second frequency modulator coupled to the external phase modulator, wherein the second frequency modulator generates a second tone microwave with a second frequency f2 to drive the external phase modulator, and the second frequency f2 is higher than the first frequency f1;
   at least one fiber amplifier coupled to the external phase modulator to amplify the light exported from the external phase modulator;
   at least one optical receiver to receive the light exported from the fiber amplifier; and
   a microprocessor coupled to the first frequency modulator and the second frequency modulator to perform modulation on the light, so as to automatically obtain a desired modulation index for a desired transmission distance.

2. The optical fiber transmitter of claim 1, wherein the first frequency f1 is set at about greater than twice of a highest frequency content of broadband signals, and the second frequency f2 is set at about at least three times of the first frequency f1.

3. The optical fiber transmitter of claim 1, wherein the light source comprises a high-power DFB laser light source.

4. The optical fiber transmitter of claim 1, wherein a type of the external phase modulator comprises one selected from a group consisting of a LiNbO3-based type and a semiconductor-based type.

5. The optical fiber transmitter of claim 4, wherein the external phase modulator further comprises:

a phase modulator driven by the second frequency modulator;

an intensity modulator coupled to the phase modulator and driven by the broadband signals, wherein the intensity modulator comprises at least one output port so as to export its output to the fiber amplifier.

6. The optical fiber transmitter of claim 5, wherein the broadband signals comprises one selected from a group consisting of an analog signal and a digital signal.

7. The optical fiber transmitter of claim 5, wherein the external phase modulator further comprises a directional coupler coupled between the intensity modulator and the fiber amplifier.

8. The optical fiber transmitter of claim 1, wherein the fiber amplifier comprises an erbium-doped fiber amplifier (EDFA).

9. The optical fiber transmitter of claim 1, wherein each of the first frequency modulator and the second frequency modulator comprises a power amplifier, so that the microprocessor can automatically adjust these two frequency modulators to obtain the desired modulation index.

10. The optical fiber transmitter of claim 1, wherein the desired modulation index is set at about 1.4 for a repeaterless design system.

11. The optical fiber transmitter of claim 1, wherein the first tone microwave and the second microwave comprise one selected from a group consisting of a single frequency microwave, a dithering microwave, and a modulated/coded microwave.

12. An optical fiber transmitter comprising:

a light source to produce a light in use;

an external phase modulator coupled to the light source to receive the light exported from the light source;

a first frequency modulator coupled to one selected from a group consisting of the light source and the external phase modulator, wherein the first frequency modulator generates a first tone microwave with a first frequency f1 to drive the selected coupled one;

a second frequency modulator coupled to the same selected one of the light source and the external phase modulator by the first frequency modulator, wherein the second frequency modulator generates a second tone microwave with a second frequency f2 to drive the selected coupled one, and the second frequency f2 is higher than the first frequency f1;

at least one fiber amplifier coupled to the external phase modulator to amplify the light exported from the external phase modulator;

at least one optical receiver to receive the light exported from the fiber amplifier; and a microprocessor coupled to the first frequency modulator and the second frequency modulator to perform modulation on the light, so as to automatically obtain a desired modulation index for a desired transmission distance.

13. The optical fiber transmitter of claim 12, wherein the first frequency f1 is set at about greater than twice of a highest frequency content of broadband signals, and the second frequency f2 is set at about at least three times of the first frequency f1.

14. The optical fiber transmitter of claim 12, wherein each of the first frequency modulator and the second frequency modulator comprises a power amplifier, so that the microprocessor can automatically adjust these two frequency modulators to obtain the desired modulation index.

15. The optical fiber transmitter of claim 12, wherein the desired modulation index is set at about 1.4 for a repeaterless design system.

16. The optical fiber transmitter of claim 12, wherein a type of the external phase modulator comprises one selected from a group consisting of a LiNbO3-based type and a semiconductor-based type.

17. A method for simultaneously suppressing a brillouin scattering (SBS) effect and composite second-order (CSO) distortions in an optical fiber transmission system, which includes a light source, an external phase modulator, an fiber amplifier, and an optical receiver coupled in cascade, the method comprising:

providing a first tone microwave with a first frequency and a second tone microwave with a second frequency, wherein the second frequency f2 is higher than the first frequency f1;

generating a light from the light source into the optical fiber transmission system;

modulating the light using the a first tone microwave and the second tone microwave on the light source only, on the external phase modulator only, or respectively on the light source and the external phase modulator, so that an optimum modulation index according to a desired transmission distance is obtained.

18. The method of claim 17, wherein the step of modulating the light further comprising using a programmable microprocessor to automatically perform modulating by simply giving the desired modulation index to the microprocessor.

19. The method of claim 17, wherein the first frequency f1 is set at about greater than twice of a highest frequency content of broadband signals used in the optical fiber transmission system, and the second frequency f2 is set at about at least three times of the first frequency f1.

20. The method of claim 17, wherein the desired modulation index is set at about 1.4 for a repeaterless design system.

* * * * *